(12) United States Patent
Nishimura

(10) Patent No.: US 6,275,000 B1
(45) Date of Patent: Aug. 14, 2001

(54) METHOD OF CONTROLLING AN INDUCTION MOTOR AND APPARATUS FOR CARRYING OUT THE SAME

(75) Inventor: Shinji Nishimura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/706,816

(22) Filed: Nov. 7, 2000

(30) Foreign Application Priority Data

May 25, 2000 (JP) .................................. 12-154728

(51) Int. Cl.$^7$ ...................................... H02P 1/26
(52) U.S. Cl. ..................... 318/811; 318/810; 318/801
(58) Field of Search ..................... 318/727, 798–815, 318/773–777

(56) References Cited

U.S. PATENT DOCUMENTS 6,008,816 * 12/1999 Nagayama et al. ................. 318/801
6,166,514 * 12/2000 Ando et al. ........................ 318/811

FOREIGN PATENT DOCUMENTS 9-261999  10/1997 (JP).

* cited by examiner

Primary Examiner—Khanh Dang
(74) Attorney, Agent, or Firm—Sughrue, Mion, Zinn, Macpeak & Seas, PLLC

(57) ABSTRACT

A method and an apparatus for controlling an induction motor which allow torque generated by an induction motor upon starting operation to be increased without need for employment of expensive switching elements of large current capacity. The control apparatus for performing a vector control of an induction motor includes a current controller (1) for controlling an exciting current component (ids) and a torque current component (iqs), respectively, of an AC power supplied to the induction motor on the basis of a command value (τm*), a current command value arithmetic unit (3) for generating an exciting current component command value (ids*) and a torque current component command value (iqs*) for the exciting current component (ids) and the torque current component (iqs) on the basis of a torque command value (τm*), and a starting unit (5) for decreasing at least the exciting current component command value (ids*) while increasing simultaneously the torque current component command value (iqs*) upon starting operation of the induction motor.

9 Claims, 5 Drawing Sheets

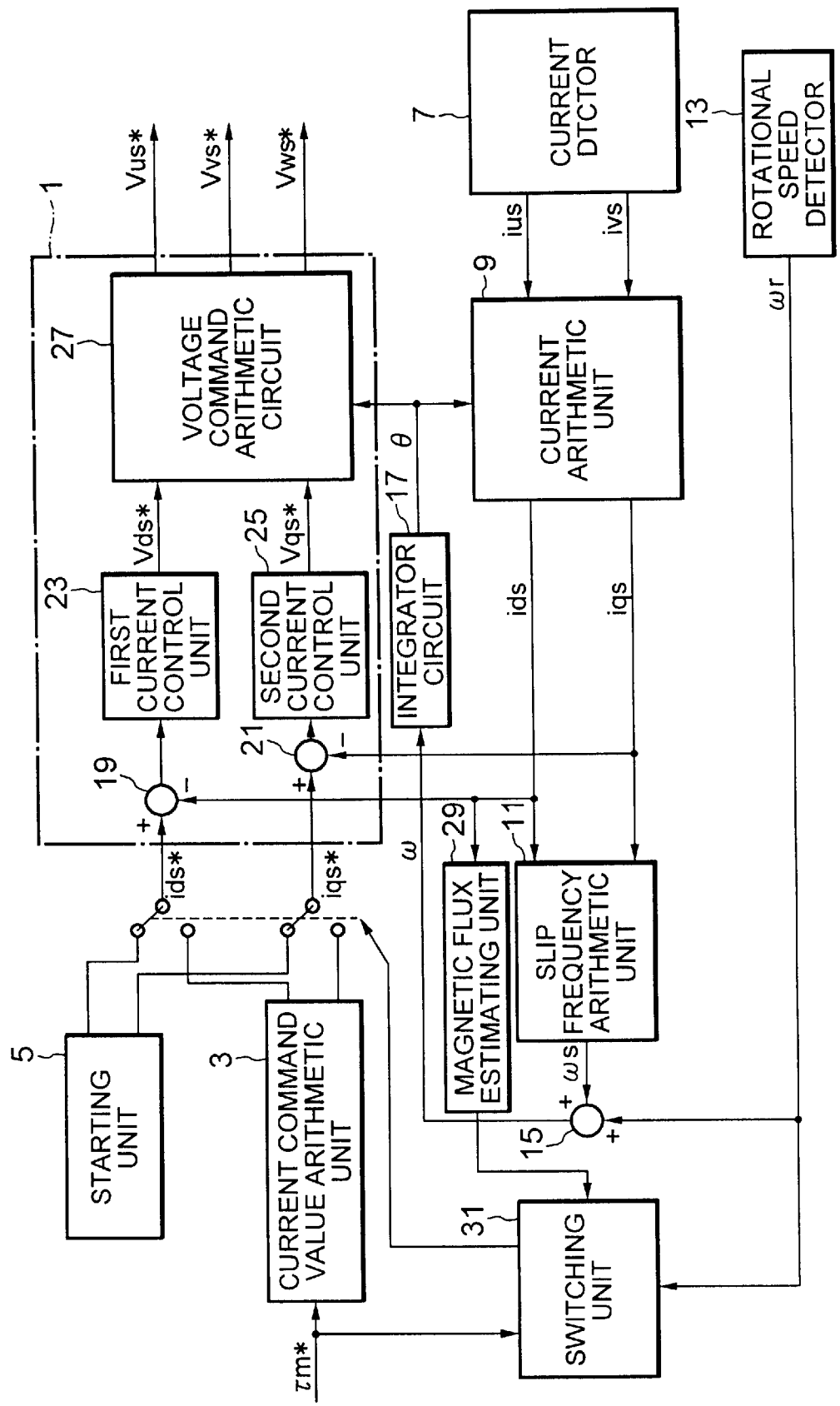

METHOD OF CONTROLLING AN INDUCTION MOTOR AND APPARATUS FOR CARRYING OUT THE SAME

BACKGROUND OF THE INVENTION

1. Field of the Invention

The present invention relates to a method of controlling an induction motor for increasing an output torque upon starting operation thereof. Further, the present invention is concerned with an apparatus for carrying out the control method mentioned above.

2. Description of Related Art

According to a hitherto known or conventional scheme for controlling the induction motor, an exciting current component (also referred to simply as the exciting current) and a torque current component (also referred to simply as the torque current) of an AC electric power supplied to the induction motor is controlled independently from each other by resorting to a control method known as the vector control or field-oriented control method. More specifically, upon starting of the induction motor (i.e., when operation of the induction motor is to be started), the exciting current is first supplied to the induction motor. Subsequently, after a sufficient or effective amount of magnetic flux has been generated, the torque current component is supplied to the induction motor for starting the operation of the same.

In addition, there is also known a so-called forcing control method according to which the exciting current of a magnitude which exceeds that of the rated exciting current is forcibly caused to flow through the induction motor for thereby generating the magnetic flux very speedily, i.e., at a very high rate. At the time point when the magnetic flux has reached the rated value, the exciting current is then decreased to the rated value thereof, whereupon the torque current is caused to flow through the induction motor for thereby allowing the operation thereof to be started.

However, in the case of the control apparatus for the induction motor which is equipped with an inverter constituted by a plurality of switching elements connected in the form of a bridge circuit, current limitation is necessarily imposed in view of the current withstanding capability of the switching elements. More specifically, the square root of a sum of a square of the exciting current component and that of the torque current component can not exceed the current limitation value imposed on the switching element. If otherwise, the switching element may unwantedly be injured. Such being the circumstances, there is the necessity of determining proportions of the exciting current component and the torque current component which can ensure a maximum torque within the limited current range. Of course, the attempt for generating the torque of greater magnitude will necessarily be accompanied with the need for employment of expensive switching elements each having a high current capacity and thus being expensive.

SUMMARY OF THE INVENTION

In the light of the state of the art described above, it is an object of the present invention to provide a method of controlling an induction motor which allows the torque generated by the induction motor upon starting operation thereof to increase significantly without need for employment of the expensive switching elements each having a large current capacity.

Another object of the present invention is to provide an induction motor control apparatus for carrying out the method mentioned above.

In view of the above and other objects which will become apparent as the description proceeds, there is provided according to an aspect of the present invention a control apparatus for performing a vector control of an induction motor, which apparatus includes a current control unit for controlling each of an exciting current component (ids) and a torque current component (iqs) of an AC power supplied to the induction motor on the basis of a command value, a current command value arithmetic unit for generating an exciting current component command value (ids*) and a torque current component command value (iqs*) for the exciting current component and the torque current component on the basis of a torque command value (τm*), and a starting unit designed for decreasing at least the exciting current component command value (ids*) while increasing at the same time the torque current component command value (iqs*) upon starting of the induction motor.

By virtue of the structure of the induction motor control apparatus described above, the torque generated by the induction motor upon starting operation thereof can be increased without need for employment of the switching elements of expensiveness and large current capacity, to a great advantage.

In the induction motor control apparatus described above, the starting unit should preferably be so designed as to decrease at least the exciting current component command value (ids*) while increasing simultaneously the torque current component command value (iqs*) to a level given by iqs*=(Imax$^2$-ids*$^2$)$^{1/2}$ upon starting of the induction motor, where Imax represents an allowable maximum current.

With the structure of the induction motor control apparatus described above, the torque generated by the induction motor upon starting operation thereof can also be increased without making use of expensive and large-capacity switching elements, to a great advantage.

According to another aspect of the present invention, there is provided a control apparatus for performing a vector control of an induction motor, which apparatus includes a current detector for detecting a primary current of the induction motor, a current arithmetic unit receiving as inputs thereto an output of the current detector and a primary frequency (ω) to thereby determine arithmetically a d-axis current component and a q-axis current component of the primary current, a slip frequency arithmetic unit receiving as inputs thereto a d-axis current component (ids) or alternatively a d-axis current component command value (ids*) of the primary current, a q-axis current component (iqs) or alternatively a q-axis current component command value (iqs*) of the primary current and the primary frequency (ω), to thereby determine arithmetically a slip frequency (ωs) of the induction motor in accordance with a predetermined functional arithmetic operation by using a constant of the induction motor, a rotational speed detector for detecting a rotational speed (rpm) of the induction motor, an adder circuit for adding together the slip frequency (ωs) outputted from the slip frequency arithmetic unit and an output of the rotational speed detector to thereby generate the primary frequency (ω), a current control unit for controlling the primary current of the induction motor so that the d-axis current component and the q-axis current component of the primary current can follow the d-axis current component command value (ids*) and the q-axis current component command value (iqs*), respectively, and a starting unit designed such that upon starting of the induction motor, the starting unit sets the d-axis current component command value as a predetermined value and decreases the d-axis current component command value while increasing the q-axis current component command value simultaneously, when the d-axis current component becomes substantially equal to the d-axis current component command value.

Owing to the structure of the induction motor control apparatus described above, the torque generated by the induction motor upon starting thereof can be increased without need for using the switching elements of large current capacity and expensiveness, to an advantage.

Further, in the induction motor control apparatus described above, the starting unit should preferably be so designed as to decrease the d-axis current component command value (ids*) to a predetermined value after the d-axis current component (ids) has become substantially equal to the d-axis current component command value (ids*).

With the arrangement described above, the time duration for sustaining the magnetic flux can be extended in correspondence to the predetermined value mentioned above, whereby the torque can be caused to decrease only slowly.

Furthermore, in the induction motor control apparatus described above, the induction motor control apparatus may further include a magnetic flux estimating unit receiving the d-axis current component (ids) as input thereto for thereby outputting an estimated value of the magnetic flux, and a switching unit which is designed such that upon starting operation of the induction motor, the switching unit transfers the d-, q-axes current component command values (ids*; iqs*) to a control performed by the starting unit while changing over the d-, q-axes current component command values (ids*; iqs*) to a control performed by the current command value arithmetic unit on the basis of a torque command value delivered from the current command value arithmetic unit.

By virtue of the arrangement of the induction motor control apparatus described above, the control to be performed by the starting unit is carried out only when the torque of large magnitude is required in the stating phase of the induction motor. When the estimated value of the magnetic flux determined by the magnetic flux estimating unit after starting of the induction motor becomes equal to or smaller than a predetermined value, the control is then transferred to the current command value arithmetic unit for performing the ordinary control based on the torque command value.

Furthermore, in the induction motor control apparatus described above, the switching unit should preferably be so designed as not to transfer the d-, q-axes current component command values (ids*; iqs*) to the control performed by the starting unit so long as the q-axis current component command value (iqs*) does not exceed a predetermined value.

With the arrangement described above, the starting unit can be inhibited from performing the control unless the torque of large magnitude is demanded in the starting operation of the induction motor.

According to a further aspect of the present invention, there is provided a method of controlling an induction motor equipped with an inverter for controlling a current flowing through a primary winding of an induction motor including the primary winding and a secondary winding, which method includes a first step of supplying an exciting current component (ids) to the primary winding upon starting of the induction motor from the state in which the induction motor is stationary, and a second step of decreasing the exciting current and at the same time feeding a torque current component (iqs) to the primary winding after lapse of a predetermined time, to thereby increase the torque current component (iqs) at a higher rate than a time constant of the magnetic flux generated in the secondary winding.

Owing to the arrangement described above, the torque generated by the induction motor upon starting operation thereof can be increased without need for employment of the switching elements of large current capacity and expensiveness.

Further, in the induction motor control method described above, the exciting current component may preferably be caused to flow in the aforementioned first step for a time not shorter than a time constant of a secondary magnetic flux in the state where the induction motor is stationary, and subsequently the exciting current may be decreased.

With the arrangement described above, the time duration of the magnetic flux in the starting phase can be extended in correspondence to the predetermined value mentioned above, whereby torque can be made to decrease only slowly (i.e., with a significant time lag).

Furthermore, in the induction motor control method described above, the exciting current may preferably be caused to flow in the aforementioned fist step for the time not shorter than the time constant of the secondary magnetic flux in the state where the induction motor is stationary, and subsequently the exciting current may be decreased to a predetermined value.

With the arrangement described above, time duration of the magnetic flux in the starting phase can be extended in correspondence to the predetermined value mentioned above, whereby torque can be made to decrease with a significant time lag, to an advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a block diagram showing generally and schematically a configuration of a control apparatus for an induction motor according to an embodiment of the present invention;

FIG. 2A to FIG. 2H are waveform diagrams for illustrating control operation of the control apparatus according to a first embodiment of the present invention, wherein FIG. 2A is a waveform diagram for illustrating a primary d-axis current component (exciting current of a stator) ids;

FIG. 2B is a waveform diagram for illustrating a primary q-axis current component (torque current of the stator) iqs;

FIG. 2C is a waveform diagram for illustrating a secondary d-axis current component (exciting current of a rotor) idr;

FIG. 2D is a waveform diagram for illustrating a secondary q-axis current component (torque current of the rotor) iqr;

FIG. 2E is a waveform diagram for illustrating a synthesized waveform of the primary d-axis current component ids and the primary q-axis current component iqs;

FIG. 2F is a waveform diagram for illustrating d-axis magnetic flux $\theta dr$ as generated in the induction motor;

FIG. 2G is a waveform diagram for illustrating a torque $\tau$ generated by the induction motor; and FIG. 2H is a waveform diagram for illustrating a rotational speed $\omega r$ of the induction motor;

DESCRIPTION OF THE PREFERRED EMBODIMENTS

Figure 2A:
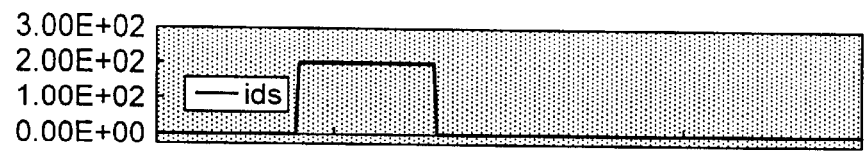

The present invention will be described in detail in conjunction with what is presently considered as preferred or typical embodiments thereof by reference to the drawings. In the following description, like reference characters designate like or corresponding parts throughout the several views.

Embodiment 1

A first embodiment of the present invention will be described by reference to FIG. 1 which is a block diagram showing generally an arrangement or configuration of the control apparatus for an induction motor according to the instant embodiment. Referring to the figure, the control apparatus for the induction motor is generally comprised of a current controller 1 for controlling an exciting current component ids and a torque current component iqs of the electric power supplied to an induction motor (not shown) on the basis of respective command values, a current command value arithmetic unit 3 for arithmetically determining an exciting current component command value ids* for the exciting current component (also referred to as the d-axis current component) and a torque current component command value iqs* for the torque current component (also referred to as the q-axis current component) in response to an input of a torque command value τm*, and a starting unit 5 for decreasing at least the exciting current component command value (d-axis current component command value) ids* while increasing simultaneously the torque current component command value (q-axis current component command value) iqs* upon starting of operation of the induction motor.

Furthermore, the control apparatus for the induction motor is comprised of a current detector 7 for detecting a primary current of the induction motor, a current arithmetic unit 9 implemented in the form of a coordinate transformation circuit for arithmetically determining the d-axis current component ids and the q-axis current component iqs which are current components of the primary current of the induction motor on the basis of a u-phase current ius and a v-phase current ivs outputted from the current detector 7 and an electrical angle θ determined arithmetically by integrating a primary frequency ω as described later on, a slip frequency arithmetic unit 11 for arithmetically determining a slip frequency ωs on the basis of the d-axis current component ids and the q-axis current component iqs both outputted from the current arithmetic unit 9 and a constant (or constants) of the induction motor, a rotational speed detector 13 for detecting a rotation speed ωr (rpm) of the induction motor, an adder circuit 15 for adding together the slip frequency ωs and the output (rotational speed ωr of the induction motor) of the rotational speed detector 13 to thereby determine the primary frequency ω, and an integrator circuit 17 for integrating the primary frequency ω derived as the output of the adder circuit 15 to thereby determine the electrical angle θ.

On the other hand, the current controller 1 is comprised of a first subtractor circuit 19 for subtracting the exciting current component (d-axis current component) ids outputted from the current arithmetic unit 9 from the exciting current component command value ids* which is outputted from the current command value arithmetic unit 3 or the starting unit 5, a second subtractor circuit 21 for subtracting the torque current component (q-axis current component) iqs outputted from the current arithmetic unit 9 from the torque current component command value iqs* which is outputted from the current command value arithmetic unit 3 or the starting unit 5, a first current control unit 23 for arithmetically determining a d-axis voltage command value Vds* by amplifying the output signal of the first subtractor circuit 19, a second current control unit 25 for arithmetically determining a q-axis voltage command value Vqs* by amplifying the output signal of the second subtractor circuit 21, and a voltage command arithmetic circuit 27 for arithmetically determining a u-phase voltage command value Vus*, a v-phase voltage command value Vvs* and a w-phase voltage command value Vws*, respectively, on the basis of the output value Vds* of the first current control unit 23, the output value Vqs* of the second current control unit 25 and the electrical angle value θ outputted from the integrator circuit 17, respectively, to thereby control the d-axis current component ids and the q-axis current component iqs to respective predetermined values.

At this juncture, it should further be mentioned that the d-axis current component ids outputted from the current arithmetic unit 9 is also inputted to a magnetic flux estimating unit (module) 29 which is designed to determine arithmetically an estimated value of the magnetic flux generated by the secondary winding of the induction motor.

Further, the starting unit 5 is designed to output a predetermined d-axis current component command value ids* and a predetermined q-axis current component command value iqs*, respectively, for or upon starting operation of the induction motor. It should be noted that the output of the starting unit 5 and that of the current command value arithmetic unit 3 can selectively be changed over to each other by means of the switching unit 31.

Inputted to the switching unit 31 are the output ωr of the rotational speed detector 13 (indicative of the rotation speed of the induction motor) and the output of the magnetic flux estimating unit 29 (indicative of the estimated value of the magnetic flux), wherein the input to the current controller 1 is changed over to the output of the current arithmetic unit 9 from the output of the starting unit 5 when the estimated value of the magnetic flux as determined by the magnetic flux estimating unit 29 exceeds a predetermined value in the state where the rotational speed is not smaller than zero (upon actuation of the induction motor) and where the torque command value τm* is not smaller than a predetermined value inclusive.

Transformation of the u-phase current ius and the v-phase current ivs to the currents ids and iqs on the d-, q-axes coordinates systems, respectively, which corotate with the rotor of the induction motor can be realized by the current arithmetic unit 9 in accordance with the following expressions, respectively.

$$ids = (3/2)^{1/2} \text{ ius } \cos\theta + ((1/2)^{1/2} \text{ ius } + 2^{1/2} \text{ ivs}) \sin\theta$$

$$iqs = ((1/2)^{1/2} \text{ ius } + 2^{1/2} \text{ ivs}) \cos\theta - (3/2)^{1/2} \text{ ius } \sin\theta$$

On the other hand, transformation of the voltage command values Vds* and Vqs* on the d-, q-axes coordinates, respectively, into a u-phase voltage command value Vus*, a v-phase voltage command value Vvs* and a w-phase voltage command value Vws*, respectively, is carried out by the voltage command arithmetic circuit 27 in accordance with the following expressions, respectively:

$$Vus^* = (2/3)^{1/2}(Vds^* \cos\theta - Vqs^* \sin\theta)$$

$$Vvs^* = (1/2)^{1/2}(Vds^* \sin\theta + Vqs^* \cos\theta) - (1/6)^{1/2}(Vds^* \cos\theta - Vqs^* \sin\theta)$$

$$Vws = -Vus^* - Vvs^*$$

Furthermore, the slip frequency ωs determined by the slip frequency arithmetic unit 11 can generally be represented by the undermentioned expression:

$$\omega s = (Rr/\phi dr)(M/Lr)iqs$$

where Rr represents a secondary resistance of the induction motor,
Lr represents a secondary inductance of the same, and
φdr is given by = Mids/(1+(Lr/Rr)P)
where P representing a differential operator P.
Accordingly, in the steady state where the exciting current component ids undergoes no change, the slip frequency can be determined by $$\omega s = (Rr/Lr)(iqs/ids) \text{ or}$$

$$\omega s = (Rr/Lr)(iqs^*/ids^*).$$

The primary frequency ω can be determined by adding together the slip frequency ωs mentioned above and the output ωr of the rotational speed detector provided for detecting the rotational speed of the induction motor such as, for example, an encoder, a resolver, a pulse generator, the speed estimating unit or the like by means of the adder circuit 15. Further, the electrical angle θ can be determined by integrating the primary frequency ω by the integrator circuit 17.

In the ordinary operating state of the induction motor, a torque command value τm* is externally inputted to the current command value arithmetic unit 3, whereby a predetermined d-axis current component command value ids* and a predetermined q-axis current component command value iqs* are arithmetically determined, respectively, by means of the current command value arithmetic unit 3, while differences between the d-axis and q-axis current components ids and iqs mentioned previously and the d-axis and q-axis current component command values ids* and iqs*, respectively, are determined by the first subtractor circuit 19 and the second subtractor circuit 21, respectively. Additionally, under the control (proportional-plus-integral control) performed by the first current control unit 23 and the second current control unit 25, the voltage command values Vds* and Vqs* on the d- and q-axes, respectively, are generated to be subsequently converted to the voltage command values Vus*, Vvs* and Vws* of the u-, v- and w-phases, respectively, to be outputted.

Through the control described above, the torque τ as generated by the induction motor can be expressed as follows:

$$\tau = Pm \, (M^2/Lr) ids \cdot iqs$$

where Pm represents the number of pole pairs, and M represents excitation inductance.

At this juncture, it is noted that because of the limitation imposed on the maximum current for the switching elements employed for controlling the current, as mentioned previously, there arises the necessity for setting the current value given by $(ids^2+iqs^2)^{1/2}$ within a limited range. Accordingly, when the upper limit value of the current is represented by Imax, the currents ids and iqs which can ensure a maximum torque have to satisfy the following condition:

$$ids = iqs = (1/2)^{1/2} Imax$$

Thus, the maximum torque available can be given by $$\tau max = (Pm/2) \, (M^2/Lr) \, Imax$$

Next, referring to FIGS. 2A to 2H, description will be directed to the control operation performed by the control apparatus according to the instant embodiment of the present invention upon starting of the induction motor.

Figure 2B:
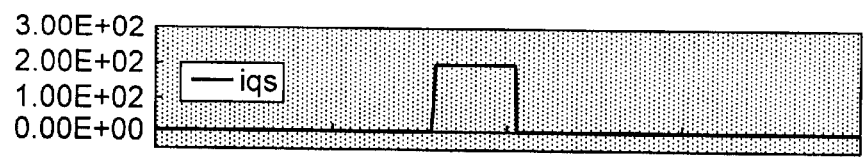
Figure 2C:
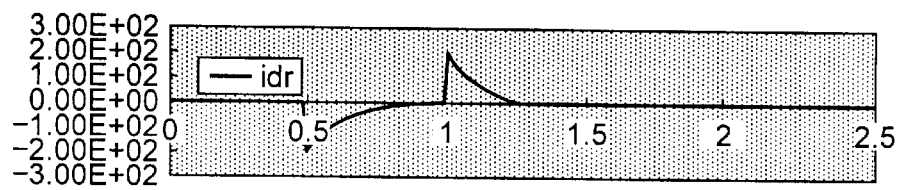
Figure 2D:
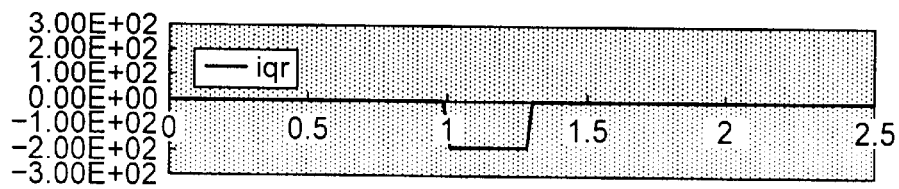
Figure 2E:
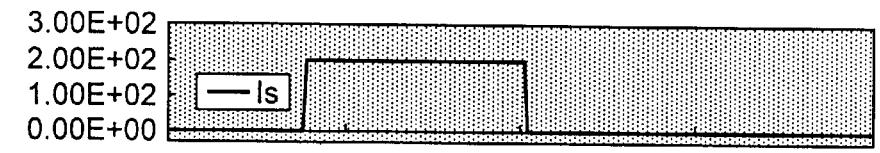
Figure 2F:
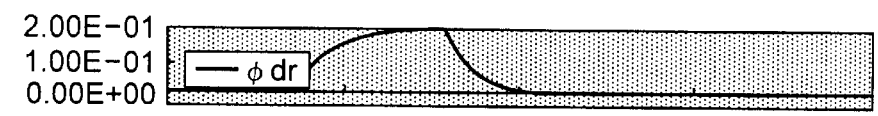
Figure 2G:
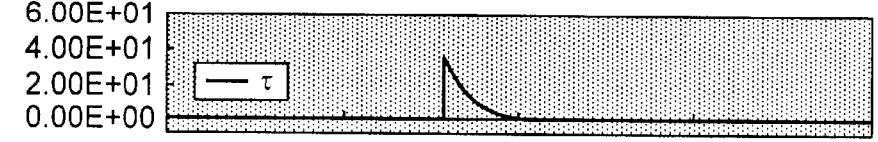
Figure 2H:
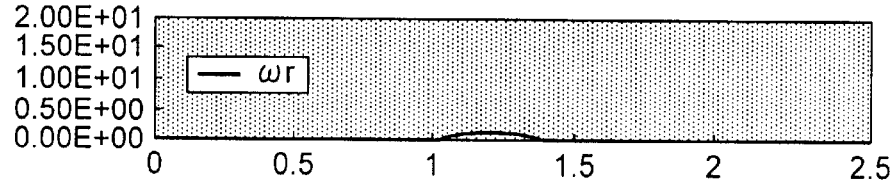

FIGS. 2A to 2H are waveform diagrams for illustrating the current components, magnetic flux, torque, the rotational speed, etc. of an induction motor. More specifically, FIG. 2A is a waveform diagram of the primary d-axis current component (exciting current component of the stator) ids, FIG. 2B is a waveform diagram of the primary q-axis current component (torque current component of the stator) iqs, FIG. 2C is a waveform diagram of the secondary d-axis current component (exciting current component of the rotor) idr, FIG. 2D is a waveform diagram of the secondary q-axis current component (torque current of the rotor) iqr, FIG. 2E is a waveform diagram illustrating a synthesized waveform Is of the primary d-axis current component ids and the q-axis current component iqs of the primary side, FIG. 2F is a waveform diagram illustrating d-axis magnetic flux θdr generated in the induction motor, FIG. 2G is a waveform diagram illustrating the torque τ as generated by the induction motor, and FIG. 2H is a waveform diagram for illustrating the rotational speed ωr of the induction motor.

Upon starting of operation of the induction motor, i.e., when the rotational speed ωr of the induction motor becomes higher than zero with the torque command value τm* being not smaller than a predetermined value while the estimated value of the magnetic flux outputted from the magnetic flux estimating unit 29 is not smaller than a predetermined value, the d- and q-axes current component command values ids*, iqs* are changed over to the outputs of the starting unit 5 in place of that of the current command value arithmetic unit 3 by means of the switching unit 31.

Figure 3:
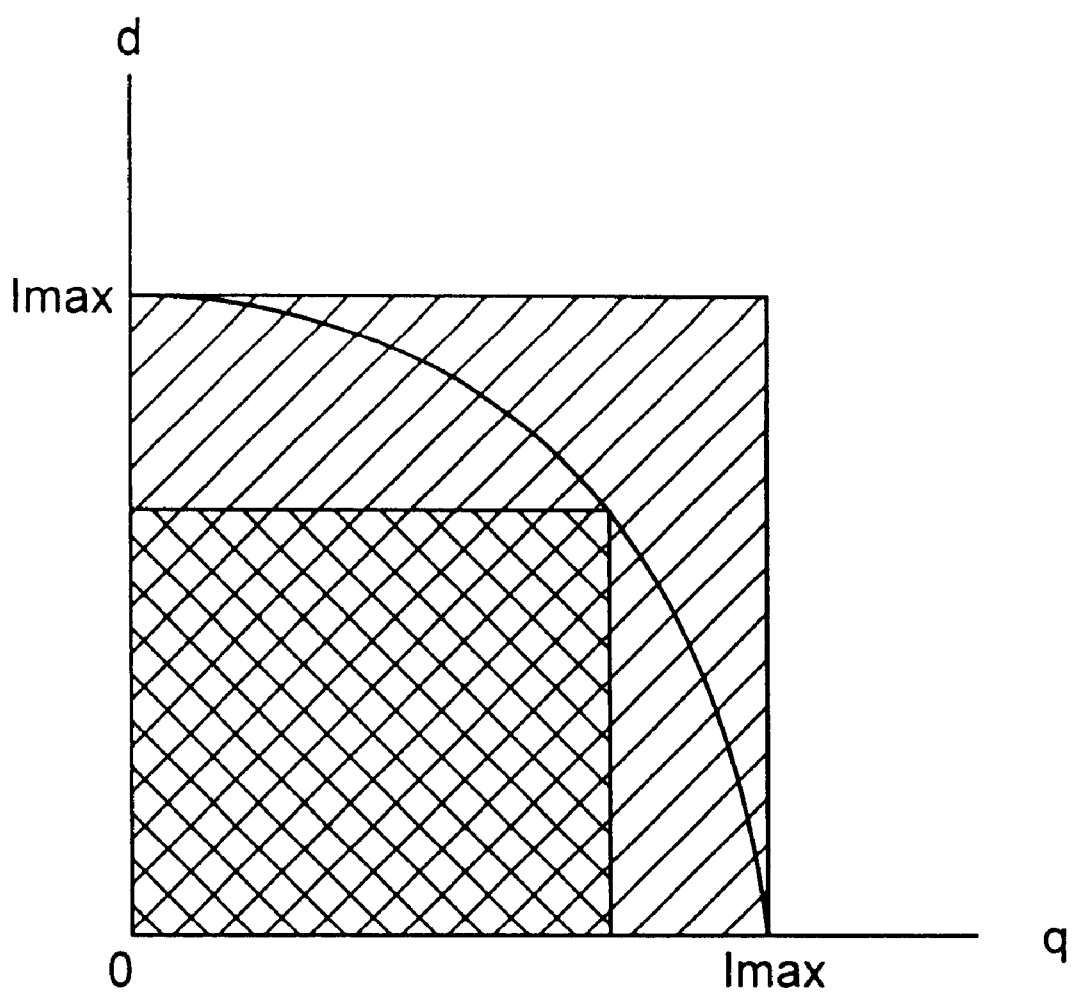
FIG. 3 is a view for graphically illustrating maximum torque characteristic in a starting control of an induction motor according to the present invention in comparison with the maximum torque characteristic in the conventional or ordinary control operation of the induction motor.

More specifically, at a time point t=0.5 second, the q-axis current component command value iqs*=0 and the d-axis current component command value ids*=Imax are outputted, respectively, from the starting unit 5, as can be seen in FIG. 2A and 2B, respectively, whereby the exciting current is caused to flow through the induction motor. At this time point, the d-axis magnetic flux φdr rises with a time constant given by Lr/Rr. Consequently, the d-axis magnetic flux φdr lags more or less relative to the d-axis current ids. After lapse of a sufficient time t (which is one second in the case shown in FIG. 2A), the d-axis magnetic flux φdr becomes approximately equal to the value given by ids·M. Thereafter, the d- and q-axes current component command values ids* and iqs* are set to "0" (zero) and the value Imax, respectively. Namely, the torque current whose phase advances by 90 degrees in the electrical angle relative to the exciting current does flow. Decreasing of the d-axis magnetic flux φdr is also accompanied with a time lag similarly to the rising as mentioned above. In this manner, because the magnetic flux decreases gradually when the currents are changed over as described above, each of the d- and q-axes current component command values ids* and iqs* (Imax) assumes instantaneously the maximum current value Imax (i.e., ids=Imax and iqs=Imax), as illustrated in FIG. 3, and the torque τ available at this time point is given by $$\tau = Pm(M^2/Lr) ids \cdot iqs = Pm(M^2/Lr) Imax^2$$

The torque τ then decreases gradually from the maximum value, as can be seen in FIG. 2G. Accordingly, the maximum torque available instantaneously can amount to about twice as large as the ordinary maximum torque (τmax=(Pm/2)($M^2$/Lr) $Imax^2$) mentioned previously without need for increasing the current capacity of the switching element of the switching unit 31.

As can now be understood from the above description, according to the teachings of the present invention incarnated in the first embodiment, the exciting current is initially supplied to the induction motor, and after generation of the magnetic flux to a predetermined value, the exciting current is decreased to the level where the magnetic flux can no more be sustained, for thereby allowing a corresponding proportion of the exciting current to be additionally supplied to the induction motor as the torque current for the purpose of increasing the torque for starting the operation of the induction motor. Furthermore, once the magnetic flux has been established, the magnetic flux attenuates at the time constant mentioned previously even when the exciting current is decreased. Thus, the magnetic flux continues to remain effective for a while. Thus, it is possible to make available the starting torque of a large magnitude by feeding the torque current in the state the remnant magnetic flux exists.

In the foregoing description, it has been presumed that when the rotational speed ωr of the induction motor becomes higher than zero with the torque command value τm* being not smaller than a predetermined value while the estimated value of the magnetic flux outputted from the magnetic flux estimating unit 29 is greater than a predetermined value inclusive, the d- and q-axes current component command values ids* and iqs* are changed over to the outputs of the starting unit 5. It should however be understood that when the torque command value τm* is not smaller than the predetermined value or when the estimated value of the magnetic flux outputted from the magnetic flux estimating unit 29 is not smaller than the predetermined value, the d- and q-axes current component command values ids* and iqs* may be changed over to the outputs of the starting unit 5 in place of those of the current command value arithmetic unit 3 by means of the switching unit 31, as occasion requires.

Embodiment 2

Figure 4A:
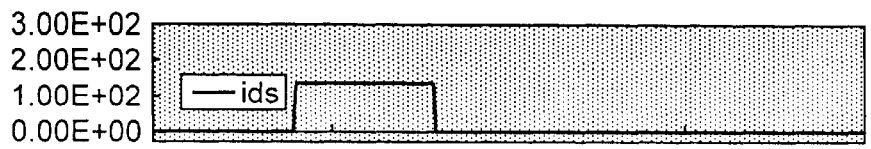
FIG. 4A to FIG. 4H are views similar to FIGS. 2A to 2H, respectively, for illustrating control operation for an induction motor according to a second embodiment of the present invention.
Figure 4B:
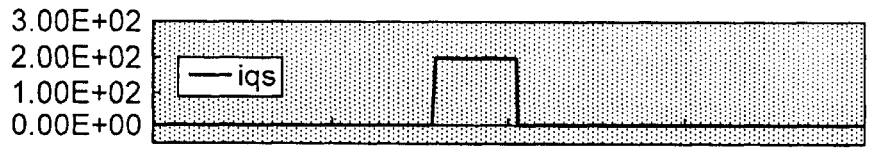
Figure 4C:
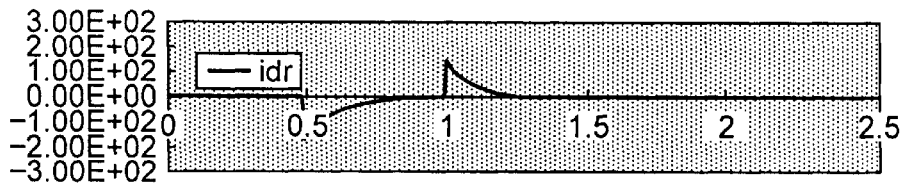
Figure 4D:
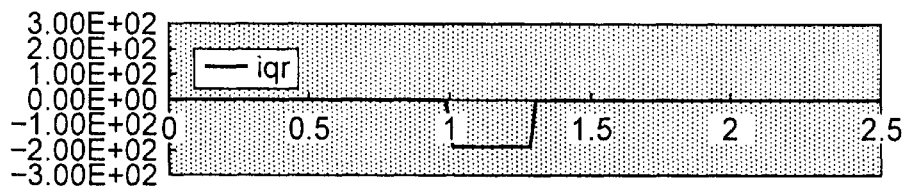
Figure 4E:
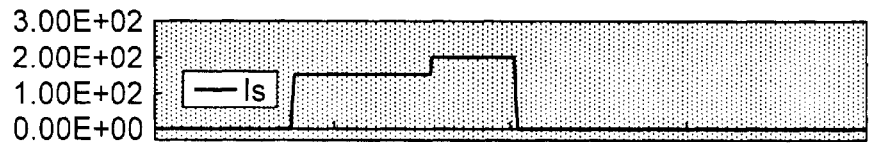
Figure 4F:
Figure 4G:
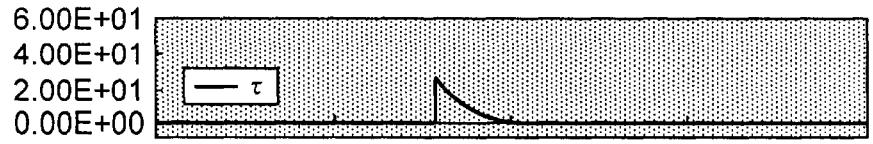
Figure 4H:
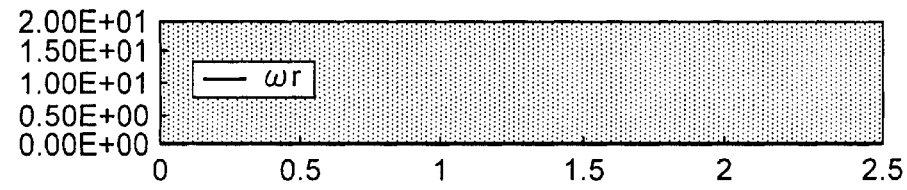

A second embodiment of the present invention is directed to the control of the induction motor in the case where the magnetic flux does not increase due to magnetic saturation even when the d-axis current component ids of the magnitude greater than Imax/$2^{1/2}$ inclusive is fed to the induction motor. This control procedure will be described below by reference to FIGS. 4A to 4H. Parenthetically, FIGS. 4A to 4H are waveforms similar to those shown in FIGS. 2A to 2H, respectively. Accordingly, repeated elucidation of FIGS. 4A to 4H will be unnecessary. In the first place, the d-axis current component ids is set to a minimum current value at which the magnetic saturation can take place (i.e., the condition that ids=Imax/$2^{1/2}$ is satisfied), to thereby generate the magnetic flux (see FIG. 4A and 4F). Subsequently, the d-axis current component ids is reset to zero (i.e., ids=0) (see FIG. 4A), while the q-axis current component iqs is set to the maximum value (i.e., iqs=Imax), as shown in FIG. 4B. Then, the magnetic flux (see FIG. 4F) decreases gradually from the magnetic flux level corresponding to the d-axis current component ids (=Imax/$2^{1/2}$), as a result of which the torque τ (see FIG. 4G) decreases gradually from the value determined in accordance with $$\tau = Pm/2^{1/2} (M^2/Lr) Imax^2.$$

In this manner, there can be generated torque of the magnitude which is $2^{1/2}$-times as large at maximum when compared with the case where the d-axis current component ids of a constant level is fed continuously to the induction motor.

[0035]

Embodiment 3

Figure 5A:
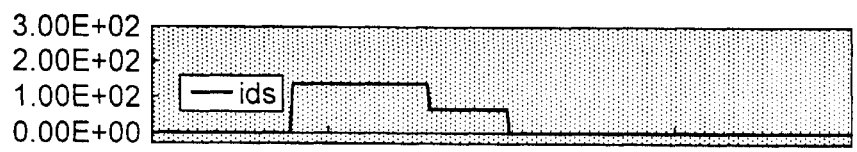
FIG. 5A to FIG. 5H are views similar to FIGS. 2A to 2H, respectively, for illustrating control operation for an induction motor according to a third embodiment of the present invention.
Figure 5B:
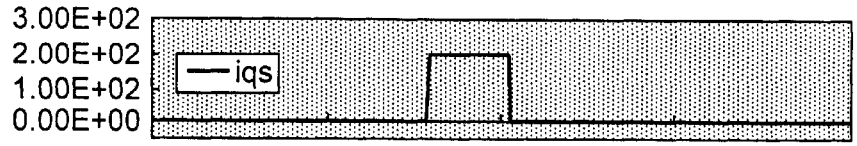
Figure 5C:
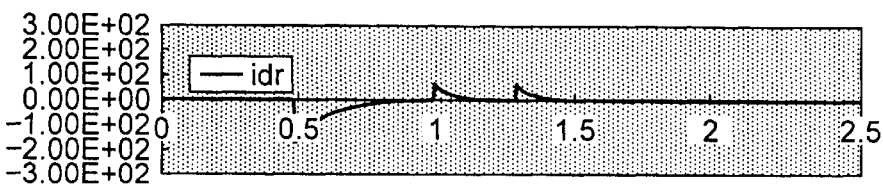
Figure 5D:
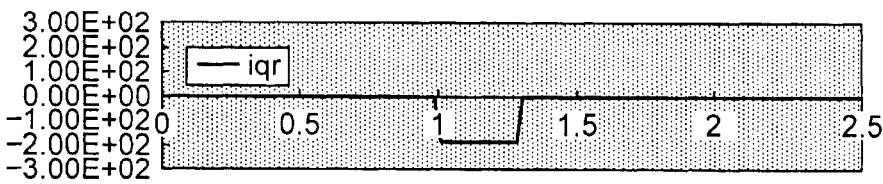
Figure 5E:
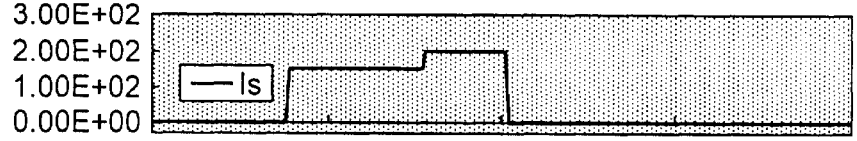
Figure 5F:
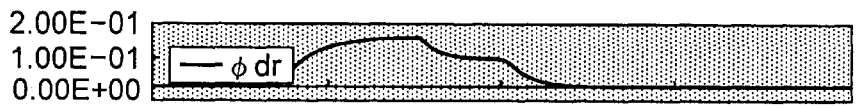
Figure 5G:
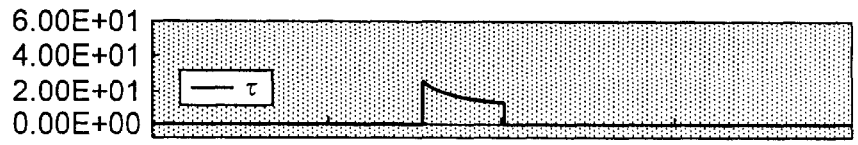
Figure 5H:
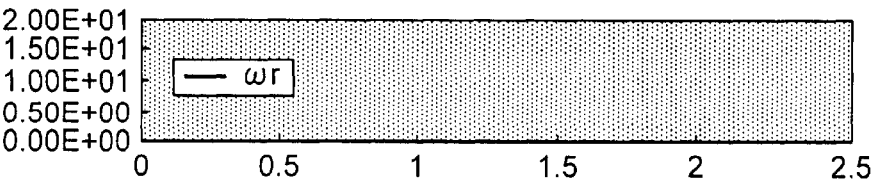

In the case of the control of the induction motor described in conjunction with the first and second embodiments of the invention, the d-axis current component ids is caused to change to zero, starting from a predetermined value. By contrast, a third embodiment of the present invention is concerned with such control of the induction motor that the d-axis current component ids is changed from a predetermined value to a smaller value, e.g. to a half of the predetermined value. FIGS. 5A to 5H are waveform diagrams for illustrating the control operation of the induction motor according to the instant embodiment of the invention. Since FIG. 5A to FIG. 5H are similar to FIG. 2A to FIG. 2H, respectively, repeated description of the former will be unnecessary. By way of example, let's assume, by way of example, that the magnetic flux is generated by setting first the d-axis current component ids to the value Imax/$2^{1/2}$ (i.e., iqs=Imax/$2^{1/2}$), as is shown in FIG. 5A. In succession, the d-axis current component ids is set to a value given by Imax/2(2)$^{1/2}$ (i.e., ids=Imax/2(2)$^{1/2}$), as is shown in FIG. 5A, while the q-axis current component iqs is set to a value given by Imax(1−(1/2(2)$^{1/2}$)$^2$)$^{1/2}$=Imax(0.875)$^{1/2}$ (see FIG. 5B). Then, the magnetic flux decreases gradually from the level equivalent to the d-axis current component ids=Imax/$2^{1/2}$, as shown in FIG. 5F. Consequently, the torque τ generated by the induction motor (see FIG. 5G) is given by the following expression:

$$\tau = ((0.0875)^{1/2}/2^{1/2})(PmM^2/Lr)Imax^2$$
$$= 0.661(PmM^2/Lr)Imax^2$$

Thus, there can be obtained the torque which is at maximum about 1.3 times as large as the torque generated in the steady operation state, while the time duration for which the magnetic flux is sustained can be extended, because the magnetic flux decreases to the level equivalent to the d-axis current component ids=Imax/2(2)$^{1/2}$ from the value equivalent to the d-axis current component ids=Imax/$2^{1/2}$, which in turn means that the torque can decrease only slowly.

In this manner, by decreasing the d-axis current component command value to a predetermined after the d-axis current component has become substantially equal to the d-axis current component command value, the time duration of the magnetic flux upon starting of the induction motor can be extended in correspondence to the above-mentioned predetermined value, whereby decreasing of the torque can be retarded correspondingly.

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact constructions and operations illustrated and described.

By way of example, although the present invention has been described in conjunction with the structures and operations of the control apparatuses, the present invention is never restricted to such hardware configuration. As can readily be understood by those having ordinary knowledge in this technical field, the present invention can be implemented in terms of control methods which can be carried out by resorting to a microcomputer or microprocessor. Thus, the recording medium storing the induction motor control method according to the present invention is also to be interpreted as falling within the purview of the present invention.

Accordingly, all suitable modifications and equivalents may be resorted to, falling within the spirit and scope of the invention.

What is claimed is:

1. A control apparatus for performing a vector control of an induction motor, comprising:

current control means for controlling each of an exciting current component (ids) and a torque current component (iqs) of an AC power supplied to said induction motor on the basis of respective command values (ids*; iqs*);

current command value arithmetic means for generating an exciting current component command value (ids*) and a torque current component command value (iqs*) on the basis of a torque command value (τm*); and starting means designed for decreasing at least said exciting current component command value (ids*) while increasing at the same time said torque current component command value (iqs*) upon starting of said induction motor.

2. An induction motor control apparatus according to claim 1, wherein said starting means is so designed as to decrease at least said exciting current component command value (ids*) while increasing simultaneously said torque current component command value (iqs*) to a level given by iqs*=(Imax$^2$–ids*$^2$)$^{1/2}$ upon starting of said induction motor, where Imax represents an allowable maximum current.

3. A control apparatus for performing a vector control of an induction motor, comprising:

current detecting means for detecting a primary current of said induction motor;

current arithmetic means receiving as inputs thereto an output of said current detecting means and a primary frequency (ω) to thereby determine arithmetically a d-axis current component (ids) and a q-axis current component (iqs) of said primary current;

slip frequency arithmetic means receiving as input thereto said d-axis current component (ids) or alternatively said d-axis current component command value (ids*) of said primary current, a q-axis current component (iqs) of said primary current or alternatively a q-axis current component command value (iqs*) therefor and said primary frequency (ω), to thereby determine arithmetically a slip frequency (ωs) of said induction motor in accordance with a predetermined functional arithmetic operation by using a constant of said induction motor;

rotational speed detecting means for detecting a rotational speed (rpm) of said induction motor;

adding means for adding together the slip frequency (ωs) outputted from said slip frequency arithmetic means and an output of said rotational speed detector to thereby generate said primary frequency (ω);

current control means for controlling the primary current of said induction motor so that the d-axis current component (ids) and the q-axis current component (iqs) of said primary current can follow said d-axis current component command value (ids*) and said q-axis current component command value (iqs*), respectively; and starting means designed such that upon starting operation of said induction motor, said starting means sets the d-axis current component command value (ids*) to a predetermined value and decreases said d-axis current component command value (ids*) while increasing said q-axis current component command value (iqs*) simultaneously, when said d-axis current component (ids) becomes substantially equal to said d-axis current component command value (ids*).

4. An induction motor control apparatus according to claim 3, wherein said starting means is so designed as to decrease said d-axis current component command value (ids*) to a predetermined value after said d-axis current component (ids) has become substantially equal to said d-axis current component command value (ids*).

5. An induction motor control apparatus according to claim 3, further comprising:

magnetic flux estimating means receiving said d-axis current component (ids) as input thereto for thereby outputting an estimated value of the magnetic flux; and switching means which is designed such that upon starting operation of said induction motor, said switching means changes over said d-, q-axes current component command values (ids*; iqs*) to a control performed by said starting means, while changing over said d-, q-axes current component command values (ids*; iqs*) to a control performed by said current command value arithmetic means in accordance with a torque command value (τ) outputted from said current command value arithmetic means.

6. An induction motor control apparatus according to claim 5, wherein said switching means is so designed as not to transfer said d-, q-axes current component command values (ids*; iqs*) to the control performed by said starting means so long as said q-axis current component command value (iqs*) does not exceed a predetermined value.

7. A method of controlling an induction motor equipped with an inverter for controlling a current flowing through a primary winding of an induction motor including said primary winding and a secondary winding, comprising:

a first step of supplying an exciting current component (ids) to said primary winding upon starting of said induction motor from the state in which said induction motor is stationary; and a second step of decreasing said exciting current component (ids) and at the same time feeding a torque current component (iqs) to said primary winding after lapse of a predetermined time, to thereby increase said torque current component (iqs) at a higher rate than a time constant of the magnetic flux generated in said secondary winding.

8. A method of controlling an induction motor according to claim 7, wherein in said first step, said exciting current component (ids) is caused to flow for a time not shorter than a time constant of a secondary magnetic flux in the state where said induction motor is stationary, and subsequently said exciting current component (ids) is decreased.

9. A method of controlling an induction motor according to claim 8, wherein in said first step, said exciting current component is caused to flow for a time not shorter than the time constant of the secondary magnetic flux in the state where said induction motor is stationary, and subsequently said exciting current component is decreased to a predetermined value.

* * * * *